United States Patent
Cancado et al.

(10) Patent No.: US 10,351,037 B2
(45) Date of Patent: Jul. 16, 2019

(54) OBJECT HOLDER INTEGRATED WITH AN AIR REGISTER IN A VEHICLE

(71) Applicant: Ford Global Technologies LLC, Dearborn, MI (US)

(72) Inventors: Jeancarlo dos Santos Cancado, Brunswick (AU); Ryan Cantle, Hawthorn (AU)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/957,701

(22) Filed: Apr. 19, 2018

(65) Prior Publication Data

US 2018/0334070 A1    Nov. 22, 2018

(30) Foreign Application Priority Data

May 19, 2017    (CN) .......................... 2017 1 0358801

(51) Int. Cl.
*B60N 3/10* (2006.01)
*B60R 7/06* (2006.01)
*B60R 11/00* (2006.01)

(52) U.S. Cl.
CPC ............. *B60N 3/102* (2013.01); *B60N 3/104* (2013.01); *B60R 11/00* (2013.01); *B60R 2011/0008* (2013.01); *B60R 2011/0082* (2013.01)

(58) Field of Classification Search
CPC ... B60N 3/102; B60N 3/10; B60R 2011/0005; B60R 2011/0082; B60R 2011/0085
See application file for complete search history.

(56) References Cited

U.S. PATENT DOCUMENTS

| 6,866,318 B1 * | 3/2005 | Stevenson | B60N 3/102 165/41 |
| 9,440,573 B1 * | 9/2016 | Dunham | B60N 3/107 |

(Continued)

FOREIGN PATENT DOCUMENTS

| DE | 20206190 U1 | 8/2002 | |
| DE | 102007057066 A1 * | 6/2008 | ............. B60N 3/102 |

(Continued)

OTHER PUBLICATIONS

AC Vent Cup Holder; Iyer, B.; Apr. 27, 2016; http://www.cartoq.com/summer-accessories-from-rs-135-to-rs-4700-available-online-now/ >.

(Continued)

*Primary Examiner* — Justin M Larson
(74) *Attorney, Agent, or Firm* — Vichit Chea; Kolitch Romano LLP

(57) ABSTRACT

An object holder attached to an air register of a vehicle is provided. The holder comprises an outer member detachably connected to a bezel of the air register and configured to be pivotable away from the bezel; an inner member slidably connected to the outer member. The inner member includes a sliding mechanism and a base, and the sliding mechanism is configured to slide along an inner surface of the outer member. The sliding mechanism is stowed inside the frame at a non-use position and the sliding member is at an extended state and outside the frame at a use position. At the use position, both the outer member and the inner member are translated and pivoted away from the air register.

20 Claims, 6 Drawing Sheets

(56) References Cited

U.S. PATENT DOCUMENTS

| | | | | |
|---|---|---|---|---|
| 2013/0264339 A1* | 10/2013 | Oldani | ............. | B60N 3/102 |
| | | | | 220/8 |
| 2015/0115650 A1* | 4/2015 | Zhang | ............. | B60N 3/102 |
| | | | | 296/152 |
| 2015/0274300 A1* | 10/2015 | Moore | ............. | B60N 3/102 |
| | | | | 224/401 |
| 2018/0334070 A1* | 11/2018 | Cancado | ............. | B60N 3/102 |

FOREIGN PATENT DOCUMENTS

| | | | | |
|---|---|---|---|---|
| DE | 102007057547 A1 * | 6/2009 | ............. | B60N 3/102 |
| DE | 102008059259 A1 * | 6/2010 | ............. | B60H 1/34 |
| DE | 202014009538 U1 | 3/2016 | | |
| DE | 102015100972 A1 * | 7/2016 | ............. | B60N 3/10 |
| DE | 102015100975 A1 * | 7/2016 | ............. | B60N 3/102 |
| EP | 0979754 A2 * | 2/2000 | ............. | B60N 3/004 |
| EP | 1422083 A2 * | 5/2004 | ............. | B60H 1/34 |
| FR | 2804916 A1 * | 8/2001 | ............. | B60N 3/102 |
| JP | 2000043632 A * | 2/2000 | ............. | B60H 1/34 |
| JP | 2006327520 A | 12/2006 | | |
| WO | WO-2004039679 A3 * | 7/2004 | ............. | B60N 3/104 |

OTHER PUBLICATIONS http://www.cartoq.com/summer-accessories-from-rs-135-to-rs-4700-avarlable-online-now/.

* cited by examiner

OBJECT HOLDER INTEGRATED WITH AN AIR REGISTER IN A VEHICLE

RELATED APPLICATION

This application claims the benefit of Chinese Patent Application No.: CN 201710358801.9 filed on May 19, 2017, the entire contents thereof being incorporated herein by reference.

FIELD

The present disclosure relates generally to an object holder integrated with an air register in a vehicle, in particular, relates to an object holder to hold a cup or beverage container.

BACKGROUND

A driver and passengers may need a place to hold drinks in a vehicle. To save space and for the convenient use, a holder has been designed to be integrated with an air register to accommodate customers' need to store drinks and other small items within reach. For example, DE202014009538 discloses a holder integrated with an air vent. The holder includes an extendable member movable to a housing of the air vent and a retaining member pivotably connected to a top portion and a bottom portion of the extendable member, respectively. The retaining member acts as a frame of the air vent when the extendable member is at an extracted position. At an extended portion, a bottom portion of the retaining member is released from the bottom portion of the extendable member and an upper portion of the retaining member is pivoted away from the top portion of the extendable member, and thus a recess at a front of the bottom portion of the extendable member and the retaining member form a space for a cup or a small item.

However, the inventors have recognized some issues with the holder disclosed in DE202014009538. For example, the drink in a cup may be spilled because the cup resides on the slanted recess of the holder. Further, the holder may not be suitable for some air vents whose dimensions cannot allow the holder to have an appropriate retaining space for the cup or a beverage container. Thus, there exists a need for a simple object holder integrated with an air vent or an air register.

SUMMARY

According to one aspect, a holder for an object is provided to be used in a vehicle. The holder comprises an outer member detachably connected to a frame and configured to be pivotable away from the frame; an inner member slidably connected to the outer member, wherein the inner member includes a sliding mechanism and a base, and the sliding mechanism is configured to slide along an inner surface of the outer member. The sliding mechanism is stowed inside the frame at a non-use position and the sliding mechanism is at an extended state and outside the frame at a use position. The outer member and the inner member are translated and pivoted away from the air register at the use position.

In one embodiment, the holder may further comprise a hinge having a first end fixed to the frame and a second end connected to the outer member, wherein the outer member and the inner member are pivoted from the air register via the hinge.

In another embodiment, the hinge may include a clip having the first end attached to the frame and a hook having the second end connected to the outer member, and both the outer member and the inner member may be configured to be pivoted around an axis of the clip between the use position and the non-use position.

In another embodiment, the sliding mechanism may include two elongated plates positioned opposite each other on the inner member and substantially perpendicular to a plane of the base, and each elongated plate may have a stop at a first end to prevent further movement of the elongated plate at the extended state.

In another embodiment, the outer member may include two grooves recessed from the inner surface and configured to receive the elongated plates and guide sliding movement of the elongated plates.

In another embodiment, the base may include an inner ring and two arms connecting the inner ring to the two elongated plates respectively.

In another embodiment, each arm may have a sloped surface toward the inner ring to facilitate receipt of the object.

In another embodiment, the outer member may an outer ring concentric with the inner ring at the non-use position.

In another embodiment, the frame may be an air-register on an instrument panel of a vehicle.

According to another aspect, an object holder attached to an air register in a vehicle is provided. The object holder comprises an outer member detachably connected to the air register; and an inner member slidably connected to the outer member, a hinge. The inner member may include a sliding mechanism and a base. The hinge may include a clip and a hook. The clip is attached to the air register and the hook is connected to the outer member. At a non-use position, the sliding mechanism is stowed inside the air register. At the use position, the outer member and the inner member are translated and pivoted from the air register via an axis of the clip such that the outer member, the sliding mechanism and the base collectively form a housing to hold the object and the base is a bottom of the housing at the use position.

In one embodiment, the sliding mechanism may include at least two elongated plates positioned opposite each other on the inner member and substantially perpendicular to a plane of the base. Each elongated plate has a first end and a second end, and the first end includes a stop protruding toward the outer member.

In another embodiment, the outer member may include two grooves recessed from an inner surface of the outer member and configured to receive the elongated plates and guide sliding movement of the elongated plate.

In another embodiment, the base may be positioned at the second end of the elongated plates and includes an inner ring at a center portion and two arms connecting the inner ring and the two elongated plates.

In another embodiment, the hook may have a gooseneck like shape and pivots around the axis of the clip In another embodiment, the outer member may be an outer ring concentric with the inner ring at the non-use position and the object may a cup or a drink can.

In another embodiment, the outer member may be sized to fit a peripheral of the air register.

According to yet another embodiment, a vehicle comprises an air register in an instrument panel and an object holder attached to the air register. The air register includes a bezel and a grille. The object holder includes an outer member detachably connected to the bezel; an inner member slidably connected to the outer member, and a hinge. The inner member may include a base and at least two elongated plates substantially perpendicular to a plane of the inner member, and the elongated plates are configured to slide on an inner surface of the outer member. The hinge may include a clip is attached to an inner surface of the instrument panel inside the air register and a hook connected to the outer member and configured to be moveable in a space in the grille. The elongated plate is stowed inside the air register at a non-use position and the elongated plate is at an extended state at a use position such that the inner member is capable of being pulled out from the air register. The elongated plate, the outer member and the base collectively are pivoted away from the air register via the hinge and form a housing to hold an object.

In one embodiment, the bezel of the air register has a ring shape and the outer member is an outer ring configured to clip to the bezel and overlap with the bezel at the non-use position. A cross section of the elongated plate may have an arc shape, and a shape of an outer surface of the elongated plate may conform a shape of an inner surface of the bezel.

In another embodiment, the base of the inner member may be positioned at the second end of the elongated plates and the base may include an inner ring concentric with the outer ring at the non-use position and two arms connecting the inner ring and the two elongated plates.

In another embodiment, the air register may include a hub and the grille is disposed around the hub. A width of the arm may be smaller than an opening of the grille, and the inner ring may be configured to surround the hub at the non-use position.

The holders of the present disclosure can retain an object such as a cup or a beverage can at a stable position. As the holders are integrated into the air register at a non-use position, the styling of the instrument panel will not be comprised by creating localized intrusion, extrusion or surface gaps in the instrument panel outer surface. Further, the holders have simple structure and have a minimal impact on the airflow in the air register.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed an object holder integrated with an air register will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of object holders integrated with an air register are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
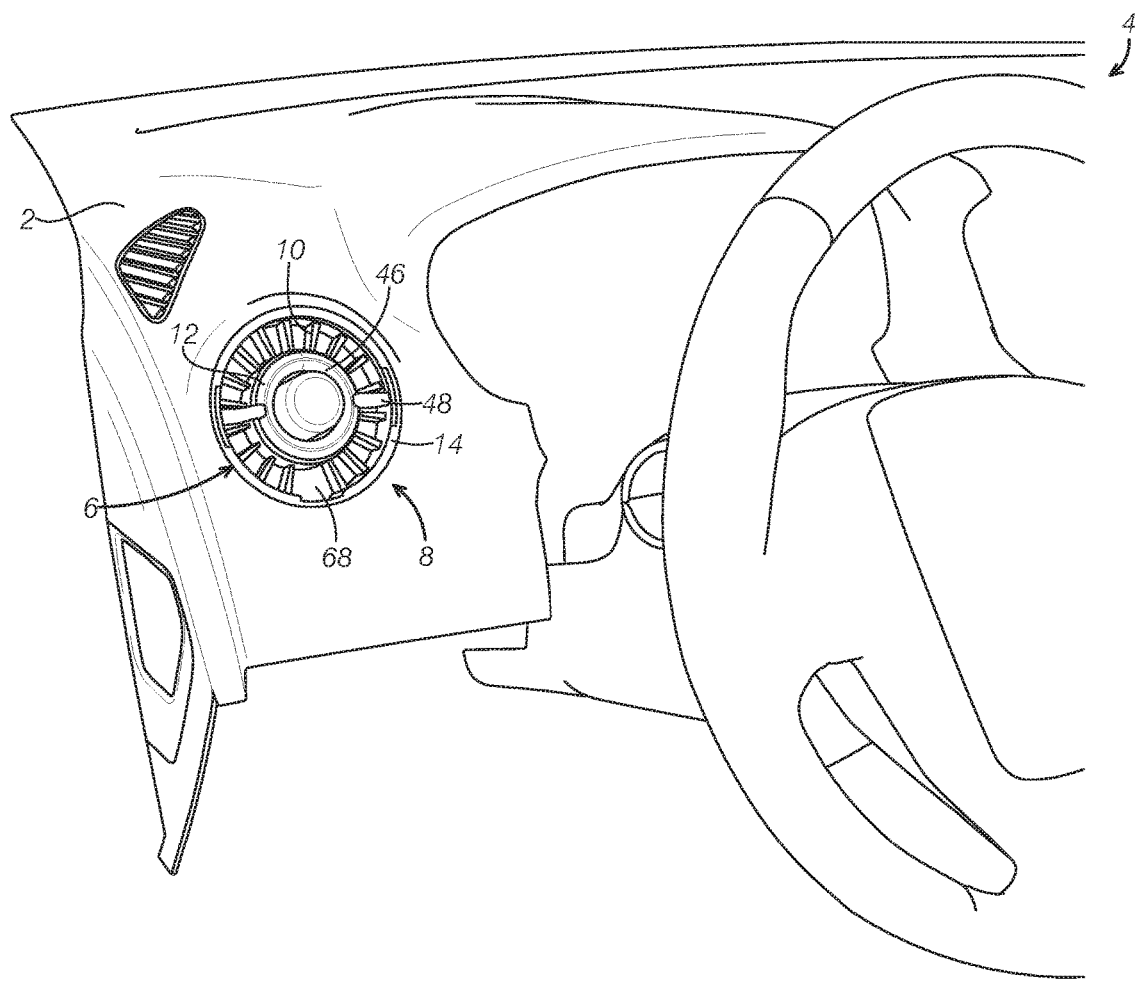
FIG. 1 is a schematic perspective view of a partial instrument panel in a vehicle in which an example holder of the present disclosure may be implemented, illustrating a holder at a non-use position.

FIG. 1 is a schematic perspective view of a partial instrument panel 2 in a vehicle 4 in which an example holder 6 of the present disclosure may be implemented, illustrating a holder 6 at a non-use position. The holder 6 may retain an object such as a cup or a beverage can or other items when it is pulled out from an air register 8 and at a use position. The air register 8 is shown to be located on the instrument panel 2. The air register 8 may include a grill 10 being comprised of multiple of bars which define spaces in the grill 10 and air may flow through the spaces in the grill 10. The holder 6 is integrated into the air register 8. As shown in FIG. 1, the holder 6 includes an inner member 12 and an outer member 14. The outer member 14 is connected on a bezel 16 of the air register (referring to FIGS. 6-7) and may be overlapped with the bezel 16 at the non-use position. In the non-use position, the outer member 14 appears to be a part of the air register 8. Thus, the presence of the holder 6 will not affect the appearance or styling of the instrument panel.

Figure 2:
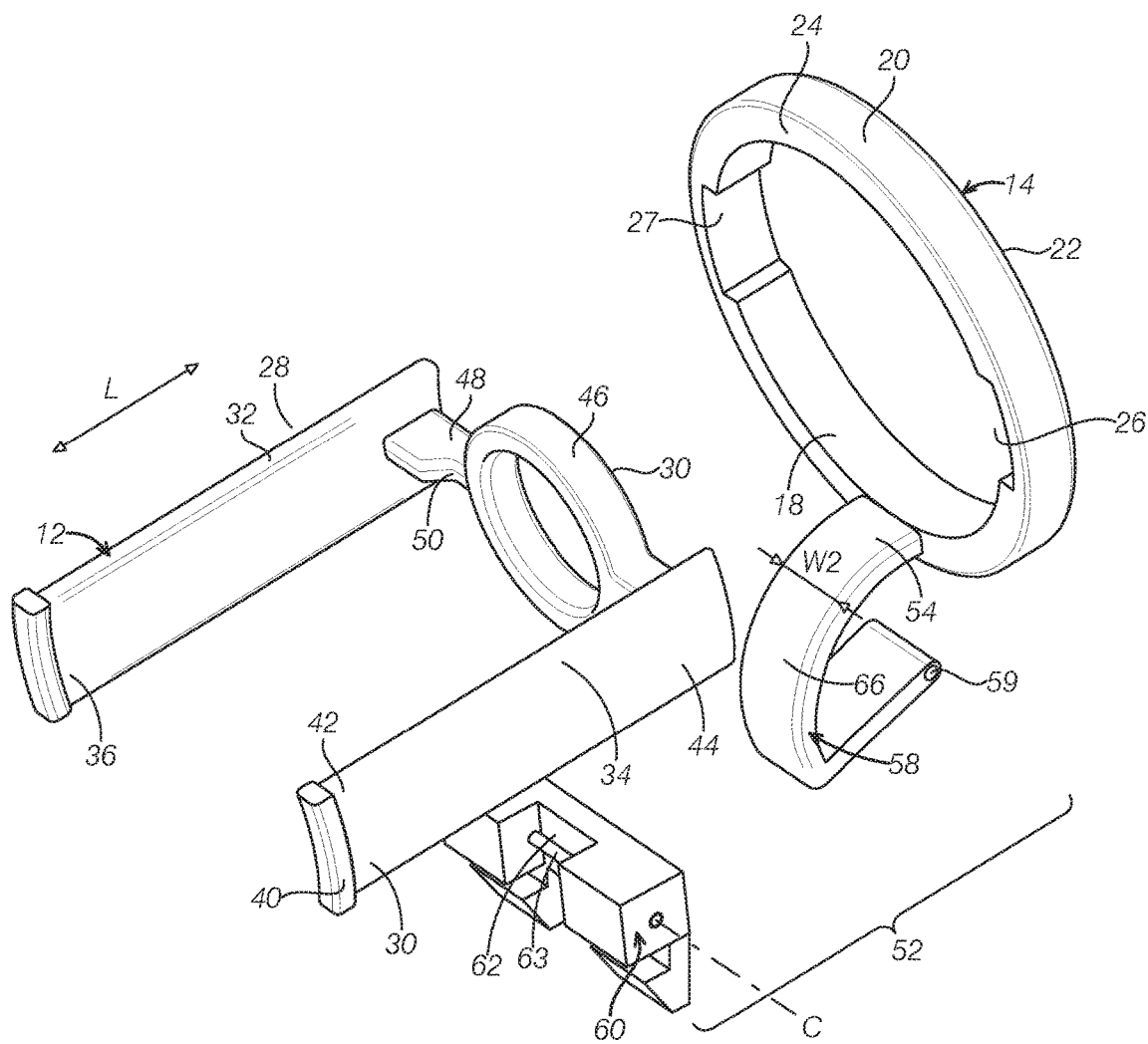
FIG. 2 is an exploded view of a holder according to one embodiment of the present disclosure.
Figure 3:
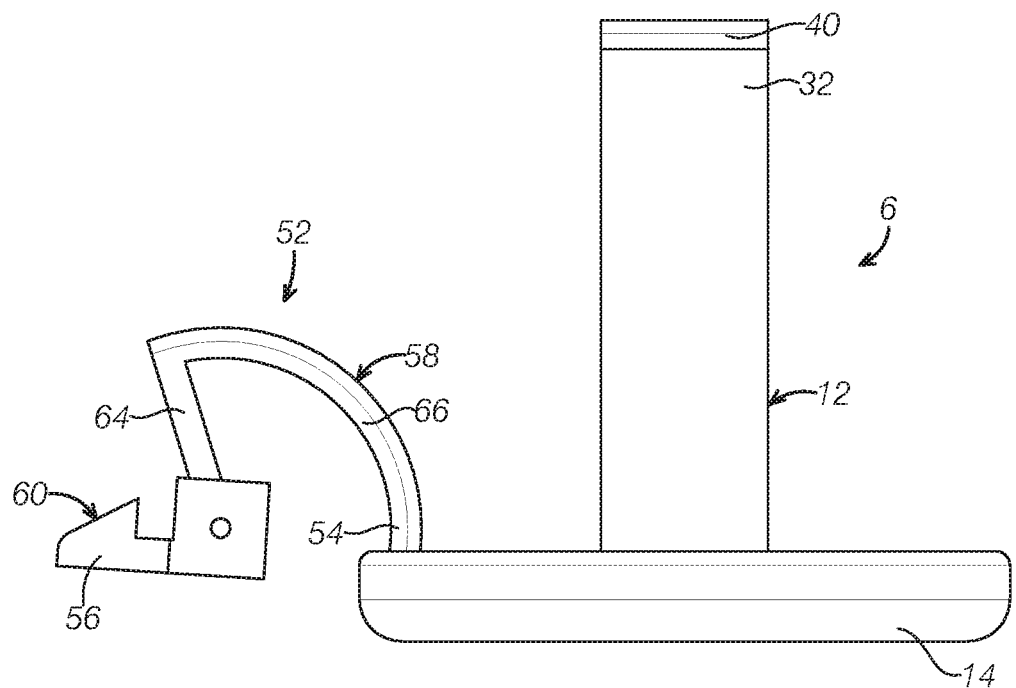
FIG. 3 is a side view of the holder in FIG. 2.
Figure 4:
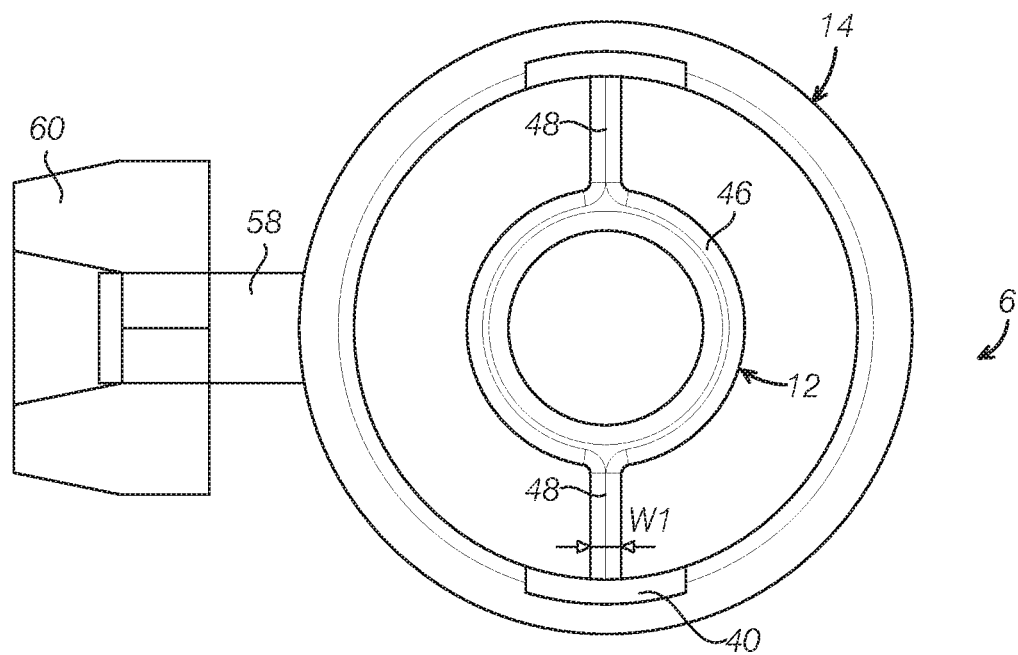
FIG. 4 is a bottom view of the holder in FIG. 2.

Referring to FIGS. 2-4, an exploded view of the holder 6 is illustrated in FIG. 2, a side view of the holder is illustrated in FIG. 3 and a bottom view is illustrated in FIG. 4. The holder 6 may include an inner member 12 and an outer member 14 detachably connected with a frame. In some embodiments, the outer member 14 may be a loop with an inner surface 18, an outer surface 20, a visible surface 22 and an invisible surface 24. The visible surface 22 refers to a surface facing an interior of a vehicle's compartment and is visible to a user. The outer member 14 or the loop 14 may have a shape matching a shape of the frame to be connected. In some embodiment, the frame may be an annular bezel of the air register 8. Accordingly, the outer member 14 may be a ring configured to be attached to the annular bezel. In other examples, the outer member 14 may be a rectangular loop or other shape complementing with the bezel of the air register.

The outer member 14 may further include a plurality of grooves 26 recessed from the inner surface 18. The grooves 26 are configured to receive a sliding mechanism 28 of the inner member and guide the movement of the sliding mechanism. The grooves 26 may have a bottom surface 27.

The inner member 12 may be slidably connected to the outer member 14 and slide along the inner surface 18 of the outer member 14 or along the bottom surface 27 or the groove 26. In some embodiments, the inner member 12 may include a sliding mechanism 28 and a base 30. The sliding mechanism 28 may include a plurality of elongated plates 32 substantially perpendicular to a plane of the base 30 and having a first end 42 and the second end 44. The base 30 is disposed at the second end 44. The elongated plates 32 is capable of sliding along the grooves 26 of the outer member 14 at its length direction L. An outer surface 34 and an inner surface 36 of the elongated plates 32 may be configured to conform the shape of the outer member 14. For example, the outer surface 34 and the inner surface 36 of the elongated plates 32 may be curved or have an arc surface to conform the arc of the outer member 14. That is, a cross section of the elongated plates 32 may have an arc shape. In some embodiments, the elongated plates 32 and the groove 26 may be clearance fit or transition fit while the elongated plates 32 may be moveable relative to the outer member 14 under a force. In another embodiment, the bottom surface 27 of the groove 26 may be flat and the outer surface 34 of the elongated plates 32 may be flat as well.

In some embodiments, the elongated plate 32 is a solid plate, which may be a flat sheet or a curved sheet.

Figure 5:
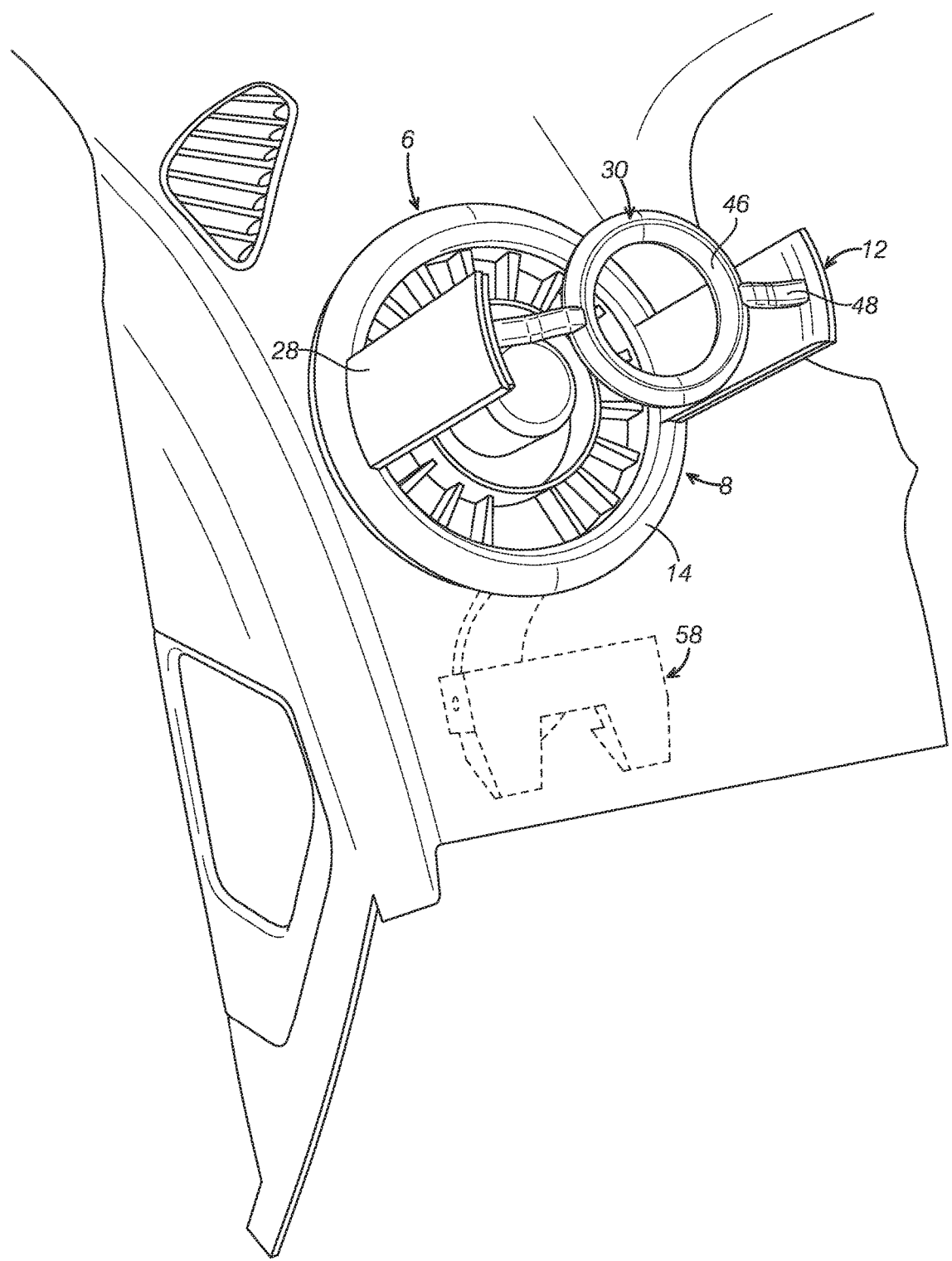
FIG. 5 is a perspective view of a holder at a first middle position.
Figure 6:
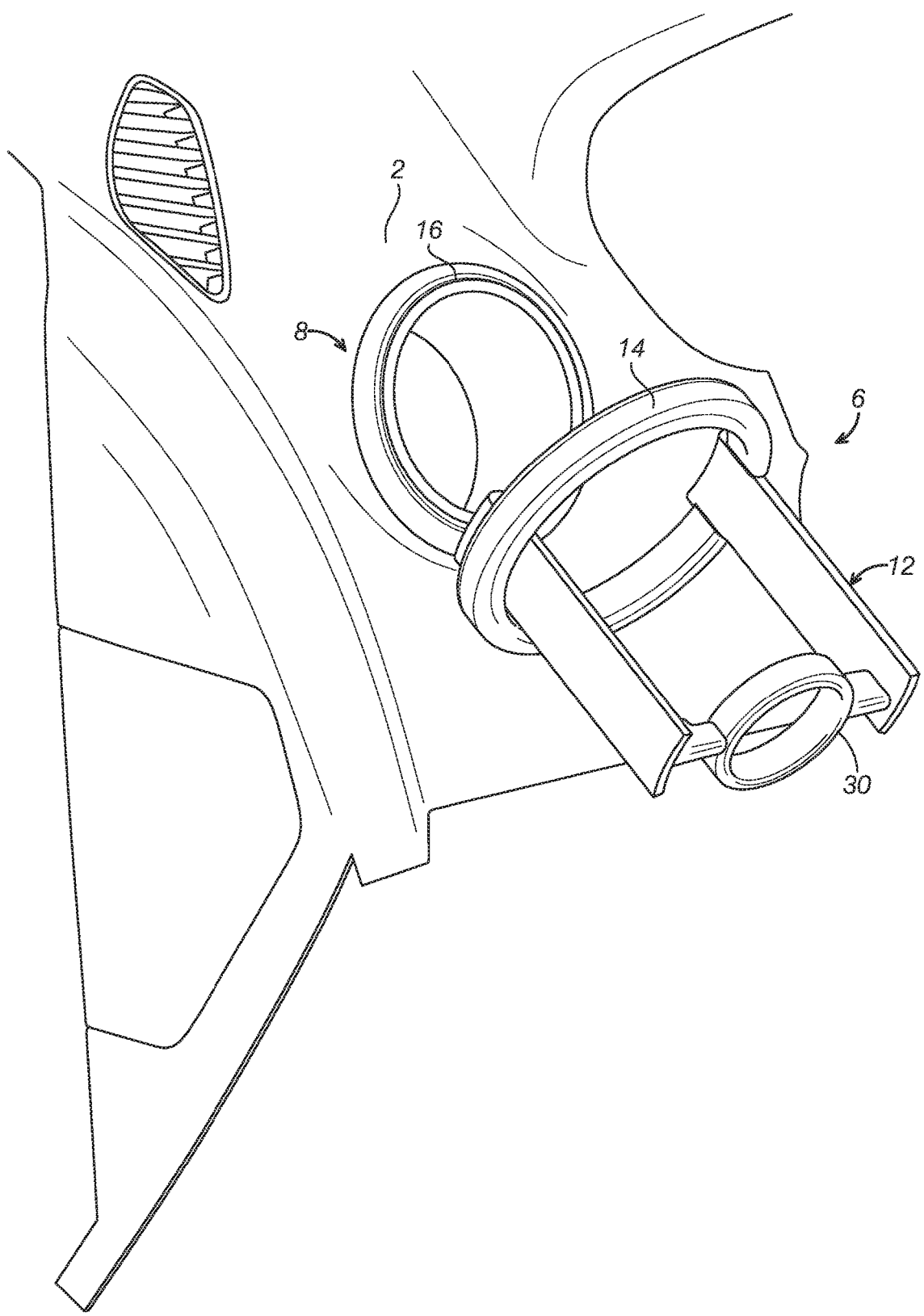
FIG. 6 is a perspective view of a holder at a second middle position.
Figure 7:
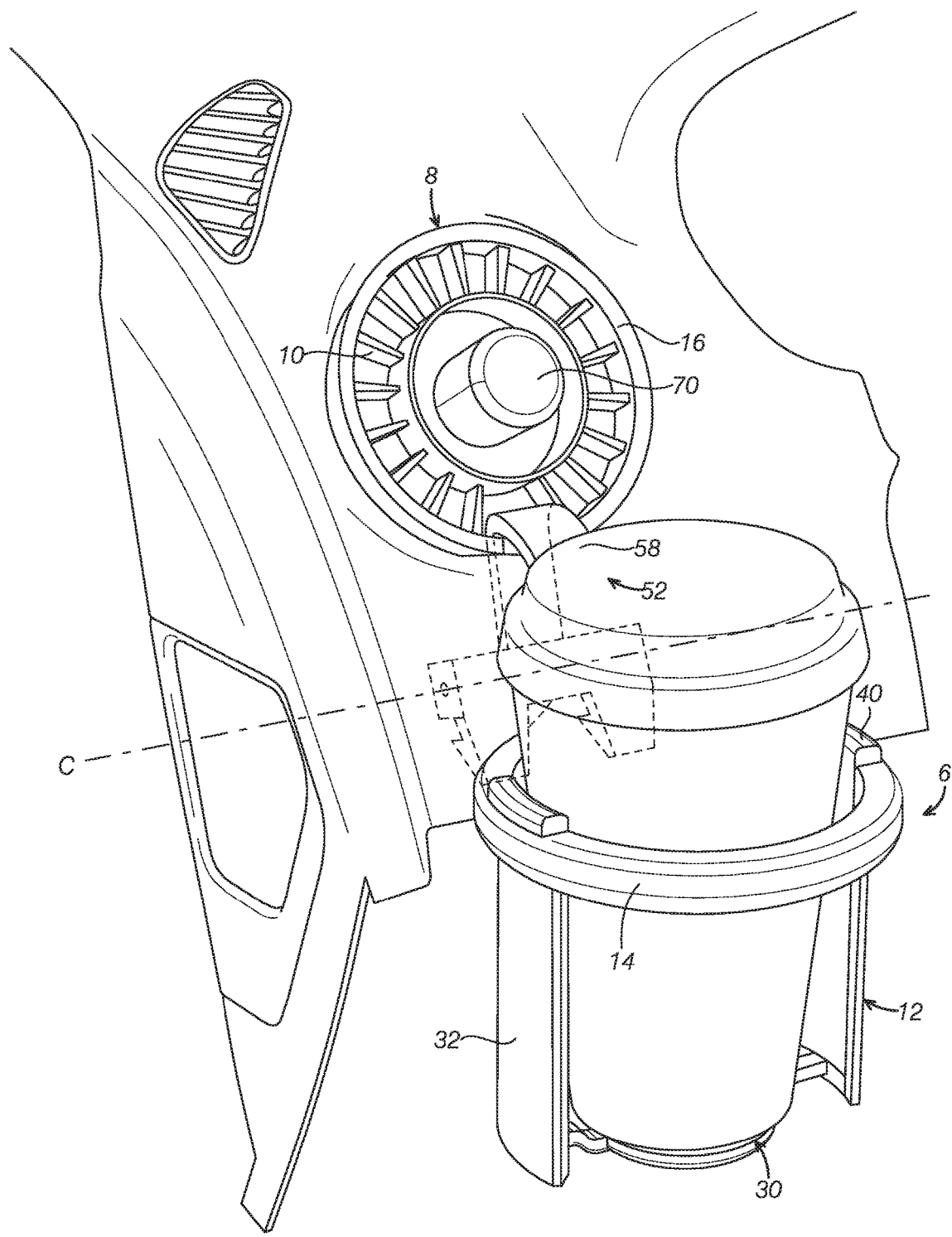
FIG. 7 is a perspective view of a holder at a use position.

The elongated plate 32 may further include a stop 40 disposed at the first end 42. The stop 40 may protrude from the outer surface 34. When the inner member 12 is at an extended state, the stop 40 prevents the elongated plate 32 to slide in the groove 26 further. It should be understood that a distance measured from the base 30 to the outer member 14 varies as the inner member 12 moves relative to the outer member 14. The extended state refers to a state at which the distance between the base 30 and the outer member 14 is maximum or the base 40 cannot be move further away from the outer member 14 as shown in FIGS. 5-7.

Referring to FIGS. 2 and 4, the base 30 may include an inner ring 46 and a plurality of arms 48 extending from the inner ring 46 and being connected with the plurality of elongated plates 32, respectively. In some embodiments, the arms 18 may include a sloped surface 50 toward the inner ring 46 to facilitate receipt of an object such as a cup or a beverage can. With further reference to FIG. 1, the arm 48 may be configured to have a width W1 smaller than a space in the grille 10 so that the presence of the arms 48 has minimized effect on the air flow at the non-use position.

The base 30 and the elongated plates 32 may be integrally formed and made from hard plastic material. Alternatively, the base 30 and the elongated plates 32 may be formed separately.

While two elongated plates 32 and two corresponding arms 48 are illustrated, it should be appreciated that the holder 6 may include three or four elongated plates 32 or any number of the elongated plates as desired. Further, it should be appreciated that the inner ring is not necessary to be circular. In other words, the base may have any suitable configurations that allow sufficient airflow at the use position and function as a bottom to holder an object at the non-use position. Further, the base and the outer member may be configured to meet the styling requirement of the instrument panel.

Continuing with FIGS. 2-4, the holder 6 further includes a hinge 52 having a first end 54 and a second end 56. The first end 54 is connected to the outer member 14 and the second end 56 is configured to be connected to a fixed location in a vehicle, such as an inner surface of the air register or an inner surface of the instrument panel 2. In some embodiments, the hinge 52 may include a clip 60 and a hook 58 pivotably connected to the clip 60. The clip 60 may include the second end 56 to be attached to the fixed location and may be any suitable clip conventionally used in the art. For example, the clip 60 may include a portion having sloped surface to be snapped into the fixed location. It should be appreciated that the second end 56 of the hinge 52 may be connected to the fixed location via other suitable approaches such as adhesive connection, screw/bolt connection, for example. In some embodiments, the clip 60 may further include a recess 62 and a pivot 63. The hook 58 may include a hole 59 configured to receive the pivot 63 such that the hook 58 can pivot or rotation along an axis C of the pivot 63.

The hook 58 may include a linear portion 64 and a curved portion 66 bent along its length or may have a gooseneck like shape. A width W2 of the curved portion 66 may be configured to be smaller than one space of the grill so that the curved portion 66 may move in and out of the space of the grill 10 freely. With further reference to FIG. 1, in some embodiments, the grill 10 may have a designate space 68 configured to allow the hook 58 or the curved portion 66 of the hook 58 to pass through. The designated space 68 may be larger than the rest of the space of the grill 10. In some embodiments, the substantially entire curved portion 66 may be moved out from the air register 8 at the use position.

The hook 58 and the outer member 14 may be integrally formed and made from hard plastic. Alternatively, the hook 58 may be formed separately and made from material different from that of the outer member 14. For example, the hook 58 may be made from material having a certain elasticity so that the hook may be deformed in a housing of the air register 8 to allow the design flexibility on the dimension of the hook.

Turning to FIGS. 5-6, the bezel 16 may protrude from a surface of the instrument panel 2. The outer member 14 of holder 6 may be sized to fit a peripheral of the air register 8 or the bezel 16. The coupling between the outer member 14 and the bezel 16 may be any suitable connection such as clearance fit or transition fit. For example, an inner diameter of the outer member 14 may be sized to be slightly larger than an outer diameter of the bezel 16 enable the clearance fit or the transition fit. Alternatively, the outer member 14 may include one or more recessed portions while the bezel 16 may include corresponding raised portions to enable snap fit between the bezel 16 and the outer member 14. In yet another example, the outer member 14 may include one or more recessed portions while the bezel 16 may include corresponding protruded raised portions to enable snap fit between the bezel 16 and the outer member 14.

Referring to FIGS. 1 and 5-7, FIG. 1 is a perspective view of the holder 6 at the non-use position, FIG. 5 is a perspective view of the holder 6 at a first middle position at the air register 8, FIG. 6 is a perspective view of the holder 6 at a second middle position, and FIG. 7 is a perspective view of the holder 6 at a use position. As can be seen from FIG. 1, the sliding mechanism 28 or the elongated plates 32 are stowed inside the air register 8 and concealed from the view of the user. As can be seen FIG. 5, the holder 6 is at the first middle position wherein the sliding mechanism 28 is at an extended state and the base 30 cannot be moved further away from the outer member 14. Continuing with FIGS. 1 and 5, to activate the holder 6, a user may pull the inner member 12 out from the non-use position as shown in FIG. 1. The user can either pull the inner ring 46 or one of the arms 48 until the elongated plate 32 is extended fully or moved to the extended state as shown in FIG. 5. At the extended state, the stops 40 contact the invisible surface 24 of the outer member 14. At the first middle position, the outer member 14 is still connected with the air register 8.

Next, the user may further pull the inner member 12 until it is separated from the air register 8 and is at the second middle position as shown in FIG. 6. At the second middle position, the outer member 14 is connected via the hinge 52. In the depicted embodiment, the hook 58 may form a first pivot angle to the axis C relative to the clip 60.

Next, the user may pull down the outer member 14 or the inner member 12 further so that the holder 16 is at the use position as shown in FIG. 7. At the use position, the hinge 52 may form a second pivot angle or the hook 58 is pivoted around the axis C at the maximum angle. Both the inner member 12 and the outer member 14 are pivoted and translated away from the air register 8 via the hinge 52 at the use position. At the use position, the base 30 functions as a bottom and the elongated plates 32 function as side supports to retain an object such as a cup or a beverage container. In other words, the elongated plates 32 and the base 30 collectively form a housing to hold the object. When a cup or a beverage can is placed in the holder 6, the weight of the object makes the base 30 at the substantial horizontal position so that the cup or the beverage can is able to be securely received in the holder and the drink would not spill from the cup or the beverage can in the holder.

Referring back to FIGS. 1 and 7, the air register 8 may include a hub 70 and a grille 10 disposed around the hub 70. The inner ring 46 may be configured to surround the hub 70 at the non-use position. In some embodiments, the outer member 14 may have a ring shape and the inner ring and the outer member 14 may be concentric at the non-use position as shown in FIG. 1. Thus, the holder 6 may provide decorative features as desired.

As can be seen from FIG. 1, the object holder 6 is concealed inside the air register 8 at the non-use position and thus the holder does not take extra space of the vehicle's interior. Because the structure of the object holder of the present disclosure provides sufficient open areas for the airflow at the non-use position, the air register can function at its normal performance level. Further, the outer member of the object holder can become a styling feature of the instrument panel. Furthermore, the object holder of the present disclosure has a simple structure and can have a low manufacturing cost.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A holder for an object, comprising:
    an outer member detachably connected to a frame and configured to be pivotable away from the frame;
    an inner member slidably connected to the outer member, wherein the inner member includes a sliding mechanism and a base, and the sliding mechanism is configured to slide along an inner surface of the outer member; and
    wherein the sliding mechanism is stowed inside the frame at a non-use position and the sliding member is at an extended state and outside the frame at a use position and wherein both the outer member and the inner member are translated and pivoted away from the frame at the use position.

2. The holder of claim 1, further comprising a hinge having a first end fixed to the frame and a second end connected to the outer member, wherein the outer member and the inner member are pivoted away from the frame via the hinge.

3. The holder of claim 2, wherein the hinge includes a clip having the first end attached to the frame and a hook having the second end connected to the outer member, and wherein both the outer member and the inner member are configured to be pivoted around an axis of the clip between the use position and the non-use position.

4. The holder of claim 1, wherein the sliding mechanism includes two elongated plates positioned opposite each other on the inner member and substantially perpendicular to a plane of the base, and wherein each elongated plate has a stop at a first end to prevent further movement of the elongated plate at the extended state.

5. The holder of in claim 4, wherein the outer member includes two grooves recessed from the inner surface and configured to receive the elongated plates and guide sliding movement of the elongated plates.

6. The holder of claim 4, wherein the base includes an inner ring and two arms connecting the inner ring to the two elongated plates, respectively.

7. The holder of claim 6, wherein each arm has a sloped surface toward the inner ring to facilitate receipt of the object.

8. The holder of claim 6, wherein the outer member is an outer ring concentric with the inner ring at the non-use position.

9. The holder of claim 1, wherein the frame is an air-register on an instrument panel of a vehicle.

10. An object holder attached to an air register in a vehicle, comprising:
    an outer member detachably connected to the air register; and
    an inner member slidably connected to the outer member, wherein the inner member includes a sliding mechanism and a base; and a hinge including a clip and a hook, wherein the clip is attached to the air register and the hook is connected to the outer member, wherein the sliding mechanism is stowed inside the air register at a non-use position and is protruded out the air register at an extended state at a use position and wherein the outer member and the inner member are translated and pivoted from the air register via an axis of the clip such that the outer member, the sliding mechanism and the base collectively form a housing to hold the object and the base is a bottom of the housing at the use position.

11. The object holder of claim 10, wherein the sliding mechanism includes at least two elongated plates positioned opposite each other on the inner member and substantially perpendicular to a plane of the base, and wherein each elongated plate has a first end and a second end, and the first end includes a stop protruding toward the outer member.

12. The object holder of claim 11, wherein the outer member includes two grooves recessed from an inner surface of the outer member and configured to receive the elongated plates and guide sliding movement of the elongated plate.

13. The object holder of claim 12, wherein the base is positioned at the second end of the elongated plates and includes an inner ring at a center portion and two arms connecting the inner ring and the two elongated plates.

14. The object holder of claim 10, wherein the hook has a gooseneck like shape and pivots around the axis of the clip.

15. The object holder of claim 14, wherein the outer member is an outer ring concentric with the inner ring at the non-use position and wherein the object is a cup, or a drink can.

16. The object holder of claim 10, wherein the outer member is sized to fit a peripheral of the air register.

17. A vehicle comprising:
an air register in an instrument panel including a bezel and a grille; and
an object holder including:
an outer member detachably connected to the bezel; and
an inner member, wherein the inner member includes a base and at least two elongated plates substantially perpendicular to a plane of the base, and the elongated plates are configured to slide on an inner surface of the outer member; and
a hinge including a clip and a hook, wherein the clip is attached to an inner surface of the instrument panel inside the air register and the hook is connected to the outer member and configured to be moveable in a space in the air register, wherein the elongated plate is stowed inside the air register at a non-use position and wherein the elongated plate is at an extended state at a use position such that the inner member is capable of being pulled out from the air register and wherein the elongated plate, the outer member and the base collectively are pivoted away from the air register via the hinge and form a housing to hold an object at the use position.

18. The vehicle of claim 17, wherein the bezel has a ring shape, wherein the outer member is an outer ring configured to clip to the bezel and overlap with the bezel at the non-use position, and wherein a cross section of the elongated plate has an arc shape, and wherein and a shape of an outer surface of the elongated plate conform a shape of an inner surface of the bezel.

19. The vehicle of claim 18, wherein the base is positioned at the second end of the elongated plates and wherein the base includes an inner ring concentric with the outer ring at the non-use position and two arms connecting the inner ring and the two elongated plates, respectively.

20. The vehicle of claim 19, wherein the air register includes a hub and the grille is disposed around the hub, wherein a width of the arm is smaller than an opening of the grille, and wherein the inner ring is configured to surround the hub at the non-use position.

\* \* \* \* \*